United States Patent
Lewis et al.

(10) Patent No.: US 7,639,693 B1
(45) Date of Patent: Dec. 29, 2009

(54) METHOD AND/OR APPARATUS DISTRIBUTING VARIABLE-SIZED DATA UNITS TO VARIABLE DESTINATIONS

(75) Inventors: Neil Jason Lewis, Burnaby (CA); Lawrence Chee, Vancouver (CA)

(73) Assignee: PMC - Sierra Ltd., Burnaby, B.C. (CA)

( * ) Notice: Subject to any disclaimer, the term of this patent is extended or adjusted under 35 U.S.C. 154(b) by 1268 days.

(21) Appl. No.: 10/356,707

(22) Filed: Jan. 30, 2003

Related U.S. Application Data

(60) Provisional application No. 60/354,064, filed on Jan. 30, 2002, provisional application No. 60/353,146, filed on Jan. 31, 2002.

(51) Int. Cl.
*H04L 12/28* (2006.01)
*H04L 12/42* (2006.01)
*H04J 3/16* (2006.01)

(52) U.S. Cl. .................. 370/395.4; 370/449; 370/470

(58) Field of Classification Search ........... 370/395.1, 370/389, 390, 391, 392, 395.4, 395.41, 449, 370/235, 236, 230, 394, 412, 329, 293, 349, 370/468, 341, 431, 432, 447

See application file for complete search history.

(56) References Cited

U.S. PATENT DOCUMENTS

| | | | |
|---|---|---|---|
| 5,742,847 A | 4/1998 | Knoll et al. | |
| 5,905,730 A | 5/1999 | Yang et al. | |
| 6,047,000 A * | 4/2000 | Tsang et al. | 370/235 |
| 6,091,709 A | 7/2000 | Harrison et al. | |
| 6,134,217 A | 10/2000 | Stiliadis et al. | |
| 6,205,150 B1 | 3/2001 | Ruszczyk | |
| 6,275,505 B1 | 8/2001 | O'Loughlin et al. | |
| 6,327,254 B1 | 12/2001 | Chuah | |
| 6,480,505 B1 * | 11/2002 | Johansson et al. | 370/449 |
| 6,501,762 B1 | 12/2002 | Pillar et al. | |
| 6,795,865 B1 * | 9/2004 | Bahl et al. | 709/235 |
| 6,798,744 B1 * | 9/2004 | Loewen | 370/235 |
| 7,110,358 B1 * | 9/2006 | Clinton et al. | 370/235 |

OTHER PUBLICATIONS

TransSwitch Corp. "TranSwitch Corporation Introduces CUBIT-Pro." Press Release Jan. 24, 1998. World Wide Web at http://www.transwitch.com/news/article/index.jsp?news=152&category=9. pp. 1-2 of 2.

TransSwitch Corp. "TranSwitch Corporation Announces CellBus® Architecture Expansion." Press Release Feb. 12, 2001. World Wide Web at http://www.transwitch.com/news/article/index.jsp?news=62 &category=9. pp. 1-2 of 2.

Wirbel (1998) "DSL show abuzz with new players; rollout woes seen." EETimes Mar. 13, 1998. World Wide Web at http://www.eetimes.com/news/98/999news/dslshow.html. pp. 1-10 of 10.

(Continued)

*Primary Examiner*—Hanh Nguyen
(74) *Attorney, Agent, or Firm*—Quine Intellectual Property Law Group; Stephen J. LeBlanc

(57) ABSTRACT

A method or system or apparatus provides improved data handling. In one aspect, destination scheduling is performed by scheduling polling rather than scheduling data emissions. In particular aspects, a scheduler assigns a weight and sequence number to each destination and tracks a port segment count and schedules polling of ports using these parameters.

19 Claims, 5 Drawing Sheets

OTHER PUBLICATIONS

"Single-Chip ADSL Transceiver Increases Port Density." TechOnLine Oct. 1, 1999. p. 1 of 1, World Wide Web at http://www.techonline.com/community/member_company/non_member/news/59/content_1707.

Risso, F. (2001) "Decoupling bandwidth and delay properties in class based queuing." Sixth IEEE Symposium on computers and communications: Jul. 3-5, 2001. Hammaimet, Tunisia, pp. 524-531.

PMC-1991709 "PM5351 S/UNI 155 Tetra with S/UNI Atlas—Reference Design" Released Sep. 2001.

RFC 1812, World Wide Web at http://www.cis.ohio-state.edu/cqi-bin/rfc/rfc1812.html pp. 1-136 of 136. F. Baker, Editor, Cisco Systems. Jun. 1995.

* cited by examiner

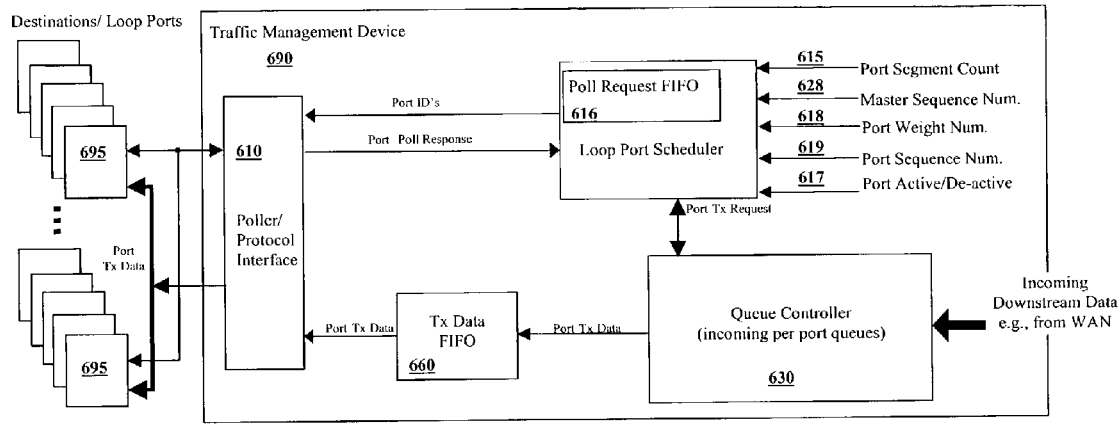
*FIG. 1*
| Port Speed Range | Logarithmic Weight |
|---|---|
| > 40Mb/s | 0 |
| 20Mb/s – 40Mb/s | 1 |
| 10Mb/s – 20Mb/s | 2 |
| 5Mb/s – 10Mb/s | 3 |
| 2.5Mb/s – 5Mb/s | 4 |
| 1.2Mb/s – 2.5Mb/s | 5 |
| 500Kb/s – 1.2Mb/s | 6 |
| < 500Kb/s | 7 |
*FIG. 4*
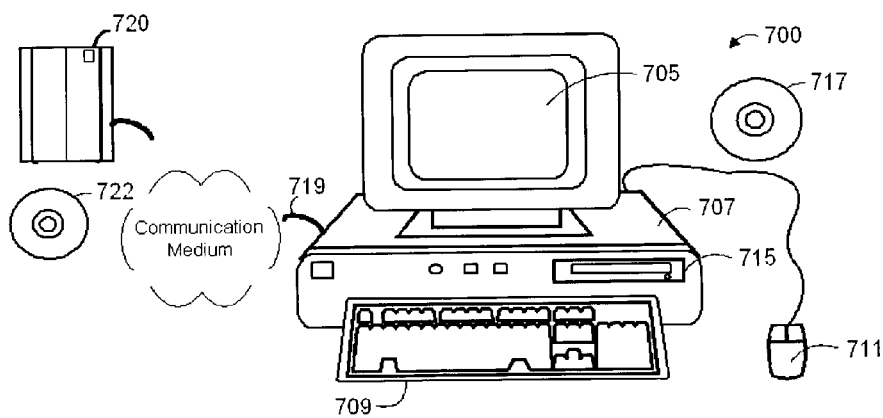
*FIG. 7*

Port Weight RAM: The numbers in the blocks represent ports. 3-bits per port in the first one Port Sequence Value RAM: Two instances because of technology restrictions. 7bits per port Port Active (Class) RAM: 8 bits per port Port Segment Count RAM: 11 bits per port.

METHOD AND/OR APPARATUS DISTRIBUTING VARIABLE-SIZED DATA UNITS TO VARIABLE DESTINATIONS

CROSS REFERENCE TO RELATED APPLICATIONS

This application claims priority from provisional application 60/354,064, filed 30 Jan. 2002.

This application claims priority from provisional application 60/353,146, filed 31 Jan. 2002.

This application may be related to material discussed in provisional application 60/352,947, filed 29 Jan. 2002.

This application may also be related to material discussed in application Ser. No. 09/580,532, filed May 26, 2000, which claims priority from provisional application 60/136,380, filed May 28, 1999.

This application may also be related to material discussed in application Ser. No. 09/574,305, filed May 19, 2000, which claims priority from provisional application 60/134,959, filed May 19, 1999.

This application may also be related to material discussed in application Ser. No. 09/569,763, filed May 12, 2000, which claims priority from provisional 60/134,119, filed May 14, 1999.

Each of the above mentioned provisional and non-provisional patent applications (including any appendices attached thereto, and incorporated and referenced documents therein) are incorporated herein by reference.

COPYRIGHT NOTICE

Pursuant to 37 C.F.R. 1.71(e), applicants note that a portion of this disclosure contains material that is subject to and for which is claimed copyright protection, such as, but not limited to, source code listings, screen shots, user interfaces, or user instructions, or any other aspects of this submission for which copyright protection is or may be available in any jurisdiction. The copyright owner has no objection to the facsimile reproduction by anyone of the patent document or patent disclosure, as it appears in the Patent and Trademark Office patent file or records. All other rights are reserved, and all other reproduction, distribution, creation of derivative works based on the contents, public display, and public performance of the application or any part thereof are prohibited by applicable copyright law.

FIELD OF THE INVENTION

The present invention is related to the field of digital communication. More specifically, the present invention is directed to methods and/or systems and/or apparatuses for scheduling data traffic from a high capacity source to a number of lower capacity destinations. In specific embodiments, the invention allows scheduling of data traffic such that contiguous segments of data traffic can be provided to a destination without unfairly penalizing other destinations.

BACKGROUND OF THE INVENTION

In a DSLAM system and other data transfer systems, data may be sent from a higher-speed or higher-capacity data source to a large number (potentially thousands) of lower-capacity destinations. In some systems, a traffic manager is responsible for distributing this data to destinations across a shared communication channel, such as a shared data bus. In some types of systems, each destination can have wide ranging data rates (for example, ranging from about 23 Kbps to about 52 Mbps) and data rates for some destinations can change during transmission (e.g., in real time). Such a large number and varying data rates of destinations present challenges in attempting to schedule data both efficiently and fairly, particularly if it is desired to avoid greatly increasing hardware size and power.

In DSLAMs and similar systems, some architectures require per port transmission FIFO's, which can be costly to implement in terms of power and size.

One proposed solution in ATM and other systems is to shape downstream traffic on a per destination such as a per port basis. In this application, the terms port and ports will be understood to constitute any appropriate data destination unless the context specifically requires otherwise. Such a per port shaping function, shapes aggregate traffic to each loop port's actual data rate, thus eliminating the need for any further scheduling. However, solutions using per port traffic shaping often must adjust the shaping rate in real time each time the loop port changes rates. Due to the latency between the loop port data rate changing and the traffic shaper rate changing, there must be a mechanism to ensure the PHY buffer (e.g., the physical interface buffer) in the loop port is not overflowed. To do this the shaper rate must be less then the actual loop port rate since the two rates are not synchronized. The rate difference represents a loss in throughput bandwidth.

Another solution in ATM-type systems is to extend the UTOPIA Level 2 (UL2) standard to support a large number of ports. This involves polling all ports, collecting and prioritizing their responses, and then sending data to the selected loop port. Solutions that try to extend the current UL2 standard can suffer from one or more limitations, such as, (1) There is no inherent mechanism for port weighting. All ports would have to be polled at a rate to satisfy the fastest loop port. (2) UL2 is not intended to support aggregate port bandwidth greater then the UL2 bus bandwidth. (3) The UL2 standard supports 31 ports; to scale UL2 to a large number of ports generally would require more polling bandwidth and additional pins. For example, scaling linearly for 2 k loop ports results in 64 poll status pins carrying very little useful information.

Prior Patents and Publications or Other Relevant Materials

The following patents and publications may be related to the invention or provide background information. Listing of these references here should not be taken to indicate that any formal search has been completed or that any of these references constitute prior art. References include:

Transwitch Cubit based DSLAM design
Motorola 860SAR based DSLAM design
IgT WAC-185/186/187/188 based DSLAM design
PMC-980448, ATM Traffic Manager Device Telecom Standard Product Engineering Document
PMC-980929, APEX Loop Port Scheduler

GLOSSARY

The following is a list of terms and abbreviations according to specific definitions as understood in the art. Listing of these terms here is intended to help the reader in understanding various aspects of the present discussion, but is not intended to limit other meanings for certain terms as they may be used or understood by practitioners in the art.

AAL5 . . . ATM Adaptation Layer 5
ADSL . . . Asymmetric Digital Subscriber Loop
ADSL.lite . . . Splitterless Asymmetric Digital Subscriber Loop Any-PHY . . . A super set UTOPIA and POS-PHY interconnect definition
APEX . . . ATM switch providing COS queuing/scheduling, shaping, and congestion management across 2 k ports targeted at DSLAM applications.
ATLAS . . . Next Generation 622 Mbps ATM Layer Solution: Address Translation, Policing and OAM
ATM . . . Asynchronous Transfer Mode
Delay Variation . . . Variance in traffic delay with respect to the nominal latency
DownStream . . . towards the access or DSLs
DSL . . . Digital Subscriber Loop
DSLAM . . . Digital Subscriber Loop Access Multiplexer
DUPLEX . . . DSLAM line card traffic aggregator and flow control manager
EPD . . . Early Packet Discard—the process of discarding all the cells of an AAL5 packet given the anticipation of congestion
FR . . . Frame Relay
GCRA . . . Generic Cell Rate Algorithm
HCS . . . Header Check Sum
HDSL . . . High Speed Digital Subscriber Loop
ICI . . . Ingress Connection Identifier
OAM . . . Operations, Administration, and Maintenance
PCR . . . Peak Cell Rate
PHY . . . Physical layer
PPD . . . Partial Packet Discard—the process of discarding the remainder of the cells of an AAL5 packet once a cell of an AAL5 packet has been discarded
SAR . . . Segmentation and Reassembly
SCR . . . Sustained Cell Rate
SDSL . . . Symmetric Digital Subscriber Loop
Shape Rate . . . The rate to which the traffic is shaped.
TC . . . Transmission Convergence
Traffic Latency . . . Processing and/or transmission delay of traffic (cells or packets in this context).
Traffic Management . . . Managing traffic from a queuing, scheduling, and congestion control perspective.
Traffic Shaping . . . The process of emitting traffic (cells for ATM) at a specified rate—the shape rate.
UpStream . . . towards the WAN
UTOPIA . . . Universal Test and Operations Interface for ATM
VC . . . Virtual Connection
VCC . . . Virtual Channel Connection
VCI . . . Virtual Channel Identifier
VDSL . . . . Very High Speed Digital Subscriber Loop
VORTEX . . . DSLAM core card traffic aggregator and flow control manager
VPC . . . Virtual Path Connection
VPI . . . Virtual Path Identifier
WAN . . . Wide Area Network
xDSL . . . Any Digital Subscriber Loop variant
ChannelID . . . is the modem channel identifier relative to the VORTEX it is connected through. It is comprised of the HSSID, and PHYID. A VORTEX maps ChannelIDs and VORTEX base addresses to PortIDs.
HSSID[n:0] . . . the serial link number within the selected VORTEX. n=2 in the current version of the VORTEX.
PHYID[m:0] . . . the channel number within the selected serial link. in is register configurable on a per serial link basis and is <5.
Polling Address . . . the 11 bit address driven from the APEX to the VORTEXs. It carries the PortID being polled.
PortActive . . . bit per port asserted if at least one cell is queued in that port
PortID . . . is the APEX loop port identifier. An 11-bit number identifying 1 of the 2 k APEX loop ports.
TPA . . . Transmit Packet Available. A signal returned from a polled port that indicates that the port is able to accept a data unit (e.g., an internal segment and/or packet and/or cell).

SUMMARY

The present invention, in various embodiments, involves a data transfer management system and/or method for transmitting data units (such as IP packets and/or cells and/or other data units) through a router or routing function to one or more destinations. A particular application is an advanced router architecture structure as will be understood in the art and described in related documents as cited herein and/or attached hereto. However, it will be apparent from the teachings provided herein that data handling scheduling according to the invention can be used in other types of logical systems.

In specific embodiments, the present invention can be involved with a system that, rather than scheduling data transfer to destinations (herein destinations may also be referred to as ports), schedules the polling of destinations to determine destination availability to accept data and then emits data to destinations with successful polls.

In specific embodiments, the invention can be involved with a system that uses weighted interleaved round robin (WIRR) scheduling in conjunction with a weight spreader function to schedule polling. In a further aspect, polling bandwidth is minimized by only polling ports that have data queued and have a high probability of being able to accept data. Ensuring a high probability in specific embodiments is accomplished by having application software set a polling interval for a port that tends to ensure that a port will only be chosen for polling after a sufficient interval has elapsed in which it will be likely that the port would have completely accepted and/or transmitted any data handled after a previous poll. Application software in various embodiments can adjust the poll interval based on detecting and changing the speed of a particular port, or, in some embodiments, based on detected repeated underruns and/or overruns at a loop port.

Some prior proposed solutions are generally capable of internally handling only fixed-size traffic, such as cells. In such systems, a positive poll response indicates that each destination port will accept one fixed-size cell. Since each poll response causes one data transmission to a particular destination port, such systems generally cannot contiguously transmit a multi-cell data unit to a port before proceeding to one or more other ports.

However, scheduling and/or delivering only single fixed-sized data units (such as cells) to destination ports can create inefficiencies in the overall transmission of data to external devices. One reason for such inefficiencies is that loop port queues and/or buffers that receive downstream data traffic often encapsulate and/or otherwise process an entire variable-length packet before transmitting that packet to an external device. Thus, generally, such loop port queues will not transmit any packet data from a loop port to an external device until the loop-port queue has received a complete data packet from an upstream scheduler. When a packet comprises several cells, the loop-port generally sits idle while waiting to get enough turns in the upstream scheduling to complete an entire packet.

A further issue is that external transmission is often much slower than the speed at which the loop-port queue receives data from the upstream scheduler. Thus, forcing a loop port to wait several turns before completing a packet can waste idle time at which the loop port could be handling slower external transmission.

In systems such as those described above, it is sometimes the case that a loop port contains sufficient buffering (and/or queuing) size and speed to receive many cells up to a full packet (generally, as defined by a particular loop port's channel) of data delivered from an upstream connection at the desired speed of the upstream connection.

Thus, according to specific embodiments, the present invention provides a scheduler of data that can deliver a number of contiguous cells (or other data units) to a particular loop-port until a desired or optimum number of units up to a full packet is transmitted to the loop-port while maintaining overall data fairness on generally a bit or byte level among all loop-ports. Thus, in further embodiments, the invention provides systems and/or devices and/or methods for scheduling traffic fairly even when delivering contiguous variable-sized data units to one or more destination ports.

In certain embodiments, various aspects according to the invention provide one or more of the following, while allowing for contiguous variable-width data units scheduling and delivery as described below:

1. Effective scheduling for a large number of destinations (for example, up to 1 k or more destination loop ports in a particular embodiment) even while allowing different destinations to receive variable length data units.
2. Support for a wide range of per-port data rates. In a specific application, for example, data rates between about 32 Kbps and 52 Mbps.
3. Fairly distributed bandwidth among destinations/ports given that aggregate port bandwidth may be greater than a shared channel bandwidth and ensuring that if maximum bandwidth is exceeded, no one port is penalized substantially more than any other port.
4. Minimized delay variation and underflow.
5. Even distribution of the available bandwidth allotted to port's of similar rates (e.g. avoiding spikes/bursts when ports of the same rate always want data at the same time).
6. Fair (according to port weight) distribution of the polling of populated ports in time, without restricting which of the ports are populated.
7. Fair (according to port weight) distribution of the polling of populated ports in time, without restricting port population according to port rate e.g. according to a an optimal and variable length of data units to ports.
8. Minimized polling bandwidth and pin requirements between a destination scheduler and destinations.

The invention further, according to specific embodiments, provides that variable length data units (e.g., variable-length packet data or variable-length fragments) can be distributed to loop ports in varying numbers of contiguous internal segments so as to achieve one or more of the following:

1. Maintain fairness among all loop ports (no ports are higher priority than other ports).
2. Maximize per loop port utilization (keep loop ports filled at their desired rate).
3. Maximize the data bus bandwidth.
4. Schedule variable-width packets and/or fragments to destinations contiguously while maintaining overall fairness.
5. Ensure relative bandwidth allocation to ports is independent of variable length data units and/or fragment size.

The invention may be used in a variety of communication systems and/or methods and/or devices where an efficient, even, and fair distribution of bandwidth to a high number of destinations is desired. Ports and/or port and/or loop port as used herein can be understood generally to represent any logical termination or destination of a data unit or data stream.

In one embodiment, the invention may be used in an APEX communication device architecture, as described in one or more of the above referenced documents, to schedule the polling of a number (such as 1 k to 2 k or more) of loop ports in a downstream direction and further providing that one or more ports will receive a complete packet and/or fragment of data when selected according to a poll. Ports as discussed herein with reference to this embodiment can in one aspect generally be understood as interfacing hardware and/or software to data handling devices such as modems (e.g., telephone, DSL, or and/or cable modems). Ports as discussed herein can also be understood as other physical device interfaces and/or as a virtual channel.

The invention according to various embodiments may also be incorporated into a communication system or communication network.

A further understanding of the invention can be had from the detailed discussion of specific embodiments and specific products incorporating aspects of the invention below. For purposes of clarity, this discussion refers to devices, methods, and concepts in terms of specific examples. However, the method of the present invention may operate with a wide variety of types of devices. It is therefore intended that the invention not be limited except as provided in the attached claims.

Furthermore, it is well known in the art that logic systems can include a wide variety of different components and different functions in a modular fashion. Different embodiments of a system can include different mixtures of elements and functions and may group various functions as parts of various elements.

For purposes of clarity, the invention is described in terms of systems that include many different innovative components and innovative combinations of components. No inference should be taken to limit the invention to combinations containing all of the innovative components listed in any illustrative embodiment.

For the sake of clarity, the invention will be explained herein with respect to specific embodiments, in some cases including specific numbers of buffers, communication lines, or other components. It will be clear to those of skill in the art that the invention may be deployed in many alternative logic applications. The invention may also be deployed as described below for operation of a wide variety of communications devices, including devices that use various types of packet protocols rather than cell protocols. For the sake of clarity, the invention will be described in terms of specific examples. It is inherent in the art that logic devices and processes and communications devices can be highly variable in the arrangement and configuration of different components. Described examples should therefore been taken as illustrations and not seen as limiting the invention and the invention should not be limited except as provided by the attached claims and allowable equivalents.

In order to facilitate description, the following discussion will describe the present invention in terms of particular methods and architectures for providing scheduling services, particular in a DSLAM environment but also applicable to other communications systems. It will be understood to those of skill in the art, however, that various innovative communication methods and devices according to specific embodiments of the invention may be used in other communication schemes. The invention should therefore not be taken as limited except as provided in the attached claims.

All publications, references, patents, and patent applications cited herein are hereby incorporated by reference in their entirety for all purposes.

BRIEF DESCRIPTION OF THE DRAWINGS

FIG. 1 illustrates an example traffic manager according to specific embodiments of the invention.

FIG. 4 illustrates scheduling weights for particular port speeds as an example according to specific embodiments of the invention.

FIG. 7 is a block diagram showing a representative example logic device in which various aspects of the present invention may be embodied.

In the different drawings, elements with the same number are intended to represent analogous but not necessarily identical elements in different embodiments of the invention.

DESCRIPTION OF SPECIFIC EMBODIMENTS

Figure 2:
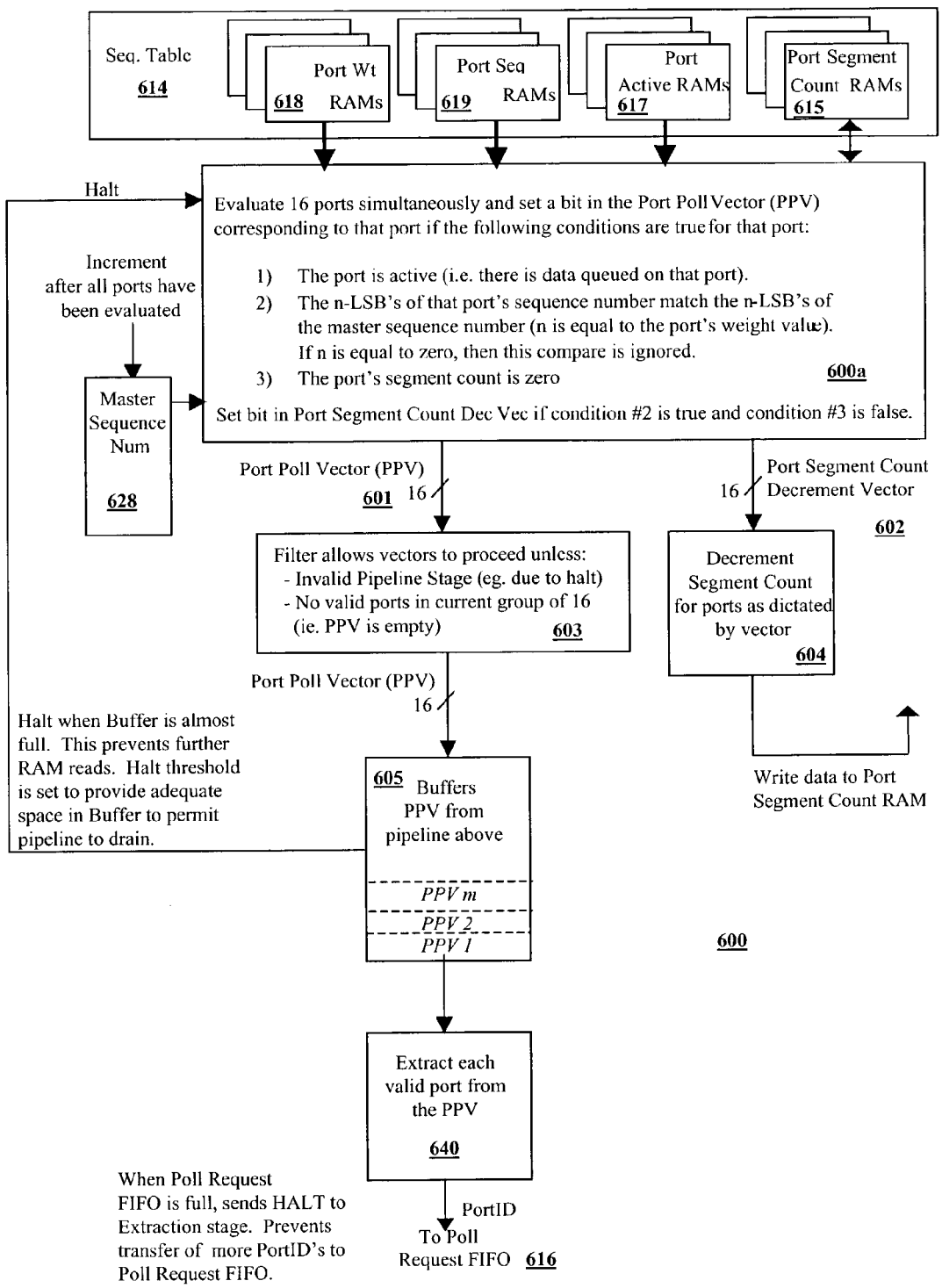
FIG. 2 is a block diagram showing an example loop port scheduler implementation according to specific embodiments of the invention.

1. Example Traffic Manager Architecture and Method

FIG. 1 illustrates an example traffic manager according to specific embodiments of the invention. As will be understood in the art, FIG. 1 can be viewed as either a circuit block diagram or as a operational block diagram illustrating a method according to the invention. As shown in the figure, an example traffic manager 690 according to the invention includes a poller 610, for issuing poll requests to a plurality of destinations (such as port terminations 695). Poller 610 can in specific embodiments also be understood to provide a protocol interface to a bus or other connection means to destinations 659. A scheduler 600 (also referred to here as a loop port scheduler or LPS) issues poll requests to poller 610 via Poll Request FIFO 616. A specific example process for selecting scheduled ports is discussed in the following section. Poller 610 uses the PortIDs from the Poll Request FIFO 616, to poll ports looking for asserted port available signals (TPAs or Transmit Packet Available) to which internal segments may be transmitted.

According to specific embodiments of the present invention, a smallest data unit within a scheduling device (e.g., 600) and/or a traffic manager (e.g., 690) is referred to as an internal segment or, more simply, a segment. For handling within the scheduling device, a segment is often handled similarly to a cell in previous devices. However, defining the internal unit separately allows separation of the internal processing and/or handling functions from strictly following external data specifications.

Generally, an ATM cell will fit into a single internal segment as defined by the invention. According to specific embodiments, a scheduler and/or scheduling method of the invention can also handle variable-length packets directed to a destination port. Packets, as is known in the art, can be variable on the fly or can be generally fixed-size but possibly larger or smaller than a segment. Packets (which are generally other-than-ATM-cells) that are small enough can fit into a single internal segment, otherwise, according to specific embodiments of the present invention, a packet is transmitted over multiple segments and/or multiple fragments. An integer multiple of internal segments that is allowed to be transmitted to a port contiguously according to specific embodiments of the present invention is referred to as a fragment.

According to specific embodiments of the present invention, the generally integer size of a fragment can be set relatively statically for each destination while a scheduler according to the invention maintains byte-wise or segment-wise fairness for destinations. Thus, various individual destination ports can be statically programmed to generally always receive a certain fixed-number of segments contiguously (such as 3, 6, or 12), or, in other words, according to specific embodiments of the present invention various destinations can have different fixed fragment lengths. In specific embodiments, the fragment length can be set to deliver an optimum amount of data to a port destination device. At times, this amount of data is determined by the most efficient burst size of memory at the destination or to meet some other characteristic of the destination device as described above.

According to specific embodiments of the present invention, the size of a fragment can be programmed at the device level (e.g., for each destination device) to be either equal to an incoming packet length, or less than an incoming packet's length. According to specific embodiments of the present invention, defining the fragment length essentially indicates at what intervals the QC will send an EOF. Thus, the fragment size indicates when the queue controller (QC) will issue an EOF. In specific embodiments, a user can set the fragment size to FULL PACKET or to less than the FULL PACKET. If a packet (or packet portion) is smaller than a fragment, then the fragment can be padded and/or truncated.

Thus, in further specific embodiments, a segment can be understood as the basic unit of transfer and counting for scheduling purposes and is handle analogous to a cell in some earlier devices. Segments are generally handled as having a fixed sized throughout the device, though a segment containing the last byte of an received packet may be truncated when it is ultimately output from the traffic management device in order to indicate the end of the packet to a destination device without having to inform the destination device explicitly of the size of a packet. Effective truncation can be accomplished as will be understood in the art through the use of null data at various points in a traffic manager according to specific embodiments of the present invention.

In further specific embodiments, a fixed fragment size can be set as an integer number of segments on a per port destination device level and fragments are generally restricted to carry data of only one packet. Thus, a large packet can be split over multiple fragments, with a last fragment either padded up to a fixed sized or truncated down to the number of segments needed to complete the packet.

In further specific embodiments, it is helpful to consider all segments as being associated with a fragment (though individual internal segments can be scheduled and transmitted, in a fragment with a size of one). In further embodiments, an EOF indication is coincident with a last (or only) segment of a fragment.

In further specific embodiments, a first fragment carrying an incoming packet will have a begin packet indication (e.g., a begin bit "B") set in the first segment of that fragment, and a last fragment in a packet will have an end packet indication (e.g., an end bit "E") set in the first segment of that fragment.

For a fragment that has an end packet indication set (e.g., E=1) the EOF also indicate the end of packet. For packets less than or equal to a fixed fragment length, the first segment of a fragment holding a fragment will have both a begin packet indication set and an end packet indication set.

Poller 610 polls the requested loop port. If the loop port responds to the poll with status indicating it can accept data (e.g. responds with an active TPA), then the Poller issues a transmit data request for that port to the Queue Controller 630. The Queue Controller maintains per port queues of incoming downstream data from the WAN. Since each port is polled prior to a transmit data request being issued to Queue Controller 630, head-of-line blocking (e.g., at Tx Data FIFO 660 and/or other points in the output path of Queue Controller 630) is avoided and there is no need to have individual port output FIFOs. The Queue Controller thus sends the data for the requested port to the shared Tx Data FIFO 660. This data is then sent to the destined loop port.

As can be seen in FIG. 1, rather than scheduling or shaping cell emissions between a traffic manager such as 690 and loop ports such as 695, traffic management according to the present invention schedules the polling of destinations and/or ports and only emits cells and/or internal data units and/or fragments and/or internal segments to ports with successful polls and allows contiguous transmission of variable sized fragments to ports while maintaining cell/internal segment-level and/or byte-level fairness to ports. Further features of various specific embodiments can include: (a) a weighted fair polling distribution mechanism and/or method; (b) parallel processing of a large number (e.g., up to 16 or 32 or more) ports at a time; (c) a scheduler and/or method that can search 1 k or 2 k ports in 64 cycles; (d) each scheduled destination port poll requires one cycle; (e) specific implementations have power savings features; (f) a mechanism and/or method that only reads weight and/or sequence rams after determining that a port has data queued (e.g., PortActive is asserted by queue controller 630) in order to conserve power; (g) a last destination port detector mechanism and/or method that enhances algorithm performance; (h) a mechanism and/or method that allows a port's parameters (e.g., weight and sequence numbers) to be reconfigured without taking the port offline and providing that a traffic manager such as 690 will adapt to new parameters the next time it evaluates a port. This last element is important in some communication systems because destination loop ports may frequently change data rates.

FIG. 1 further illustrates the values used by the various components of traffic manager 690 and especially scheduler 600 to perform effective and enhanced scheduling of internal segments and variable length fragments, including Port Segment Counts 615, Port Weight Values 618, Port Active Status Values 617, Port Sequence Numbers 619, and Master Sequence Number 628.

In further specific embodiments as described in more detail below, a traffic manager according to the invention, achieves one or more of the following:

1. Maximize bus utilization (e.g., between the traffic manager and the destination ports).
2. Maintain relative fairness among ports, e.g. if a port bus's maximum bandwidth is exceeded, no one port is penalized more than any other port.
3. Ensure relative bandwidth allocation is independent of variable data unit (e.g., multiple internal segments and/or internal data units and/or fragment and/or packet) size.
4. Use a transmit data FIFO (e.g., 660) that is shared fairly among ports even allowing ports to receiving variable numbers of multiple contiguous internal segments.
5. Minimize delay variation and underflow to ports.
6. Evenly distribute bandwidth allotted to ports of similar rates.
7. Avoid spikes/bursts in data demands on a shared destination port bus (e.g., Ports of the same rate always wanting data at the same time) even when handling variable length data.
8. Allow destination port priority to be not tied to its physical port number.
9. Not require that physical port numbers are reserved as high priority ports.
10. Place no restrictions on which destination ports or port numbers are actually populated and actively receiving data and receiving data of variable lengths.
11. Minimize polling bandwidth and pin requirements between a Traffic manager (e.g., 690) and destination/loop port devices (e.g., 695).
12. Allow port parameters and/or variable size internal fragments to be reconfigured on the fly without taking the port or scheduler (e.g., 600) offline.
13. Provide poll port vector (PPV) buffering within scheduler 600 to allow a scheduler to continue scheduling other valid ports while one or more previously scheduled ports are already in an extraction process. In some prior systems, once a PPV reached an extraction stage, the scheduler stopped scheduling until such extraction was complete. According to specific embodiments of the present invention, with a buffer for the PPV, evaluation of further ports can be performed while a device is in the extraction phase. In specific embodiments, this further facilitates scheduling for variable sized data units or fragments of multiple internal segments.

2. Example Detailed Loop Port Scheduler Architecture and Method

FIG. 2 is a block diagram showing an example loop port scheduler implementation according to specific embodiments of the invention. FIG. 2 can be viewed as either a circuit block diagram or as a operational block diagram illustrating a method according to the invention.

In this figure, a number of elements from previous implementations as discussed in the above referenced documents are used to extract each valid port. Furthermore, the PPV width has changed from some earlier described devices. Each one of the bits in the 16-bit port segment count decrement vector indicates one port for which the segment count is to be decremented. In a particular embodiment, each cycle through an LPS (such as 600) processes 16 ports. Alternative embodiments can process other numbers of ports in parallel, such as 8 or 24 or 32.

In this example, to increase scheduling efficiency, a number of different ports (such as 16 or 8 or 24 or 32) are evaluated in parallel. In specific embodiments, an LPS according to the invention minimizes the required polling bandwidth by adhering to the following: (1) only ports that have data queued in Queue Controller 630 are eligible to be polled; and (2) avoid polling a port when the port can not accept new data. The latter can be accomplished in specific embodiments by relating a port's poll rate with its actual data rate.

As a guideline for application software establishing initial weight values, a port generally should not be polled more often than twice its data rate unless there is excess poll bandwidth. Application software in a communication system will be responsible for initial destination port (e.g., a modem) rate setup and for changing rates after detecting speed changes at a destination port. Driver software generally residing on a traffic manager (e.g., 690) is responsible for both determining an appropriate distribution for sequence numbers in various weights and assigning sequence numbers to ports as described herein and in referenced documents. When necessary, the driver software will also reassign sequence numbers when distribution of ports in weight groups becomes significantly unbalanced due to port deactivations.

Example Logarithmic Weight Scheduling Algorithm

As described in above referenced documents, in order to distribute polling bandwidth efficiently and fairly among ports, the following scheduling algorithm may be used in specific embodiments of the invention when selecting a port to poll:

Each port is assigned a 3-bit logarithmic weight (LW) value defining the relative rate of the port. A port's relative weight (RW) is calculated as $RW=2^{(7-LW)}$, providing eight discrete relative weights between 1 and 128. The LW value is used to determine how frequently a port is polled.

Each port is assigned a 7-bit sequence value (which may also be referred to as a sequence number or a poll sequence identifier). Ports that share the same weight value should be assigned an even distribution of sequence values. This sequence value is used to distribute the polling of ports of the same weight evenly over time.

Segment Counting

Furthermore, according to specific embodiments of the present invention, an internal segment count or segment count (e.g., in a specific embodiment, an 11-bit value) is maintained for each port. This count can be maintained in a designated storage area such as, for example RAM 615. The purpose of the segment count is to allow the weight to represent the relative bandwidth allocation independent of the variable fragment (or packet) size, by suppressing polling in response to the segment count even when polling is indicated by the weight factor. However, while actual polling is suppressed, the scheduling of polling continues and is used to decrement the segment count, as described herein.

According to specific embodiments of the present invention, a port's segment count is incremented each time the Queue Controller 630 transmits a segment for that port, provided the segment is not designated as an end of fragment (EOF). A segment marked as an EOF is not counted, according to specific embodiments of the present invention, because generally, each port is allowed to receive one segment in response to a poll. Thus, only excess (more than one) segments delivered to a destination port are counted. For ports receiving data units that are not larger than one internal segment, each segment transmitted to the port is marked as an EOF and so the port's segment count is not incremented.

To ensure fairness, according to specific embodiments of the present invention, a port is forced to skip poll opportunities when its segment count is non-zero. A port's segment count is decremented each time the port passes a poll opportunity, whether or not a poll would have been issued according to other criteria, such as port active status or whether a previous transmission to a port is completed.

Master Sequence Number Cycling

According to specific embodiments of the present invention, an LPS maintains a master sequence number 628, which is generally of a predetermined width, e.g., 7-bits. The LPS monotonically cycles through numbers (e.g., 128) in sequence. The master sequence counter increments once upon each completion of a polling sequence, counting linearly from 0 to 127, rolling over to 0, and continuing.

Scheduler Operation

For each master sequence number, central scheduler or sequencer 600a evaluates each port based on its eligibility conditions and schedules ports to be polled if the following three conditions are met:

(1) There is data currently queued to that port (e.g., the port has its PortActive bit asserted). This condition eliminates wasting polling bandwidth by not polling ports that do not need to be polled. In specific embodiments, this determination is made independently of whether the port segment count will be decremented. Thus ports will have their segment count decremented even if they do not have data currently queued;

(2) The n-LSB's of a port's sequence number match the n-LSB's of the scheduler's master sequence value, where n is equal to the port's 3-bit LW value. This condition is ignored when the port's LW value is equal to zero. Thus, if n=0, the port matches every master sequence number; if n=1, the port matches every second MSN; if n=2, the port matches every fourth MSN, etc. In a particular embodiment, therefore, each Polling Sequence can result in anywhere from 0 to the maximum number of supported ports (such as 2048) being determined eligible. In specific embodiments, this determination does effect a port segment count will be decremented and ports are only decremented when they qualify for a poll under this condition; and (3) The port's segment count is zero. In specific embodiments, this determination is made regarding a port before a current decrement is applied to a port segment count.

In a further embodiment, an additional requirement is that the port does not have a request for cell retrieval pending. In other words, if a polled port indicated it was able to accept data during a previous poll, and a transmission of data to that port has not been completely sent to the port, a second request to transmit data to that port is not issued. This can either be accomplished by LPS 600 or poller 610 suppressing the poll or by the queue controller 630 suppressing the transmit request. In specific embodiments, this additional requirement is made independently of whether the port segment count will be decremented. Thus ports will have their segment count decremented even if a previous transmission of data to that port has not been completely sent if the ports otherwise would be scheduled for a poll.

The value of the LSBs of those ports that are selected (in a specific embodiments, five bits) are encoded into a poll port vector (PPV). In specific embodiments, this is simply a 16-bit vector, with active bit positions indicating LSBs of ports selected for polling. The remaining MSBs of ports selected (in a specific embodiment, six bits) are output by 600a as, for example, the port number base 607.

The value of the LSBs of those ports that are eligible to have their segment count decremented (in specific embodiments, four or five bits) are then encoded into a Port Segment Count Decrement Vector 602. In specific embodiments, this is a 16-bit vector, with active bit positions indicating LSBs of ports selected for decrementing. A decrement function 604 uses the port number base 647 and the Port Segment Count Decrement Vector to decrement the correct Port Segment Count Decrement Vector in storage 615.

An optional Filter 603 allows PPVs to proceed unless there is a halt causing an invalid pipeline stage or unless the PPV is empty.

Driver software in the traffic manager sets Poll Sequence Identifiers such that ports at the same weight are evenly distributed throughout the polling sequences. Having software set the Poll Sequence Identifiers in this manner enables a port of any bandwidth (within the supported range) to be placed on any PortID and still be serviced according to its weight in a fair manner and further allowing ports to contiguously receive multiple internal segments to accommodate larger data units. This provides additional system design flexibility.

Sequencer 600*a* steps through each port in turn, scanning Sequencing Table 614 identifying loop ports that are eligible for polling and placing PortIDs of eligible ports into Poll Request FIFO 616. In a particular embodiment, when FIFO 616 becomes full, the sequencer stops and waits. It continues when FIFO 616 becomes not full.

Sequencing Table 614

In a specific example embodiment, storage of LW and Poll Sequence Identifier and status information about ports can be understood as stored in a Sequence Table 614, which in a specific example embodiment can be understood as containing 29 bits per port: 3 bits for the Polling Weight, 7 bits for the Poll Sequence Identifier, 8 bit indicating PortActive (indicating that there is available to be transmitted to a port), and eleven bits for the Port Segment Count. Software configures the Port Weight and the Poll Sequence Identifier. The Queue Controller 630 updates the PortActive value. In a specific example embodiment, Sequencing Table 614 can be understood as a number of separate memory areas (such as individual blocks of RAMS in an ASIC) or may be understood as memory block areas defined in a larger physical memory. In specific embodiments, of the invention, the following four blocks of memory are generally accessed primarily by LPS 600.

Based on particular system design, if LPS 600 can complete a poll sequence within the average time it takes to retrieve an internal segment (or, e.g., cell) from a queue, the weighting structure guarantees that the LPS will not cause a transmit opportunity to be missed.

In a particular example embodiment, the average time to retrieve an internal segment is expected to be about 80 sysclk cycles. For 2 k ports, this would require the LPS to scan 2048/80 or approximately 25 ports per sysclk cycle, implying, for 11-bit entries, a 275-bit wide Sequence Table RAM. While this may be more than is necessary in some applications, it does put an upper bound on the Sequence Table width.

Port Active Data

In a specific embodiment, a stored PortActive value can be one to several bits (such as four or eight, one for each possible class of services). However, from the point of view of the scheduler as herein described, these bits may be ORed together, effectively producing a single port active/not_active signal. Thus, PortActive RAM 617 effectively contains a PortActive bit (or value) for each port. This memory effectively has 2 interfaces, a r/w interface used by a Queue Controller 630 to update the status bits based on active data in the queue and a read interface used by a Sequencer 600*a*. As with other memories, an interface can be provided with read/write access, for initialization and debug by software running on an included controller or externally.

Port Weight Data

The Port Weight RAM 618 contains port weight values for each port. It has two interfaces, a r/w interface used by software to update Port Weight when necessary and a read interface used by a Sequencer, e.g. 600*a*. Updates of this memory block by software are typically required only when a new line card is provisioned. Updates may also be required when modems or other destination port devices retrain to a significantly different line rate, moving the destination port into a different weighting group.

Port Sequence Data

The Port Sequence RAM 619 contains the port sequence values. It has two interfaces, a r/w interface used by software to update port Sequence Identifiers, and a read interface used by Sequencer 600*a*. Updates by software are typically required only when a new line card is provisioned. Updates may also be desired when port destination devices (e.g., modems) retrain to a significantly different line rate, moving the port into a different weighting group and possibly requiring a new distribution of port sequence values. In particular embodiments, sequence numbers and weights may be modified at any time during system operation.

Port Segment Count

The port segment count RAM 615 contains port segment count values. This memory can be understood to effectively have a r/w interface used by LPS 600 to update the status and to read a segment count indication. In particular embodiments, segment counts may be modified at any time during system operation to perform various optimization and/or configuration and/or debugging tasks.

Poll Request FIFO

The Poll Request FIFO 616 is a two interface FIFO containing PortID numbers. The write interface is updated by scheduler 600. The read interface is used by poller 610.

The Poll Request FIFO according to specific embodiments of the present invention is designed to be shallow enough so the information within it does not become stale, creating unfairness between ports; yet large enough to ensure that it rarely under-runs. However, it may underrun if the Sequencer requires more time to find the next eligible port then it takes for the Poller to empty the Poll Request FIFO. Under-running results in no polling actions, which can result in missed transmit opportunities.

In the example embodiment illustrated in FIG. 2 and discussed above, a number of ports are evaluated at the same time (such as 16 or 32). While other very different implementations according to the invention are possible, this particular design is included for completeness of the disclosure and to disclose possibly preferred embodiments and to describe further independently innovative aspects.

Buffering of Port Poll Vectors (PPV)

According to specific embodiments of the present invention, buffering of Port Poll Vectors in buffer 605 can result in further enhanced performance over earlier devices because buffering allows a scheduler to continue scheduling other valid ports despite there being multiple valid ports in a PPV undergoing extraction. In some prior devices, when multiple valid ports in the PPV are in an extraction phase, an LPS generally stops further scheduling activities. However, according to specific embodiments of the present invention, the buffering of PPV's allows an LPS to continue evaluating vectors for scheduling.

3. Extracting Port IDs

Figure 3:
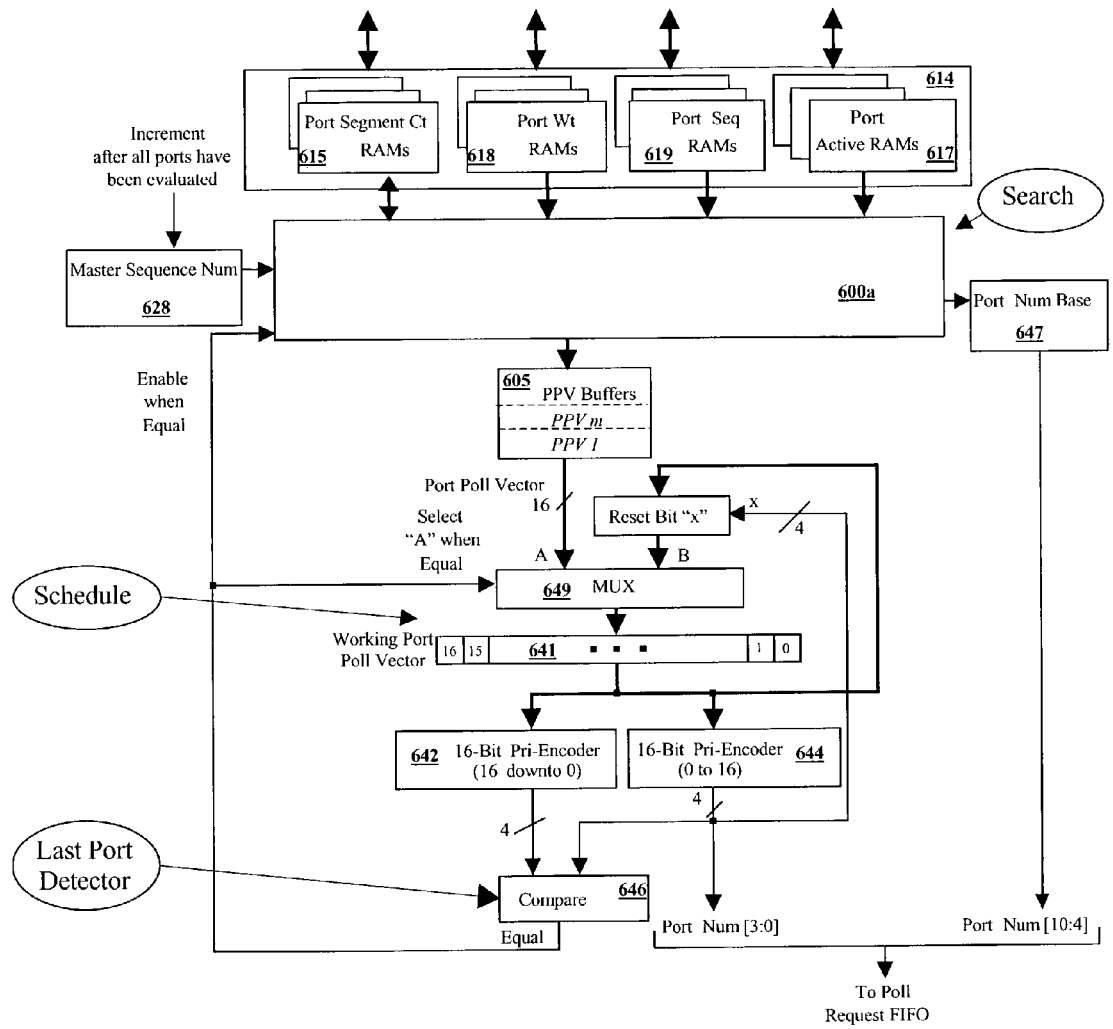
FIG. 3 is a block diagram showing parts of an example loop port scheduler implementation illustrating port id extraction according to specific embodiments of the invention.

FIG. 3 is a block diagram showing parts of an example loop port scheduler implementation illustrating port id extraction according to specific embodiments of the invention. It will be understood to those of skill in the art that this figure is directly adapted from above referenced patent applications and is provided for completeness. For clarity, not all elements shown in FIG. 2 are duplicated in FIG. 3. Some width indications have been adjusted to reflect a 16-bit PPV embodiment. This figure is provided as an illustration of one possible implementation.

As shown in FIG. 3, a PPV is output from buffer 605 through a multiplexor 649, to a working PPV location 641.

From this location, a single PortID is selected to output to the Poll Request FIFO 616 as follows. The PPV is first output to two priority encoders 642 and 644. Each of these encoders output a single value representative of either the highest value (generally the most significant active bit of the PPV, which is output by 642) or the lowest value (generally the least significant active bit of the PPV, which is output by 644). Typically, this value is output as a multi-bit value (such as four or five bits). The low value output by priority encoder 644 forms the LSB for the output PortID number and the MSB of the PortID number is formed by Port Base 646. The completed PortID number is placed in the poll request FIFO 616. This output value is also sent to a reset bit module in order to deselect 1-bit corresponding to the PortID that has been placed in the poll request FIFO. It will be understood that when PPV buffering such as provided by 605 is used, it will generally also be desirable to buffer port base numbers at 647 or 605 or another appropriate point in order to allow accurate extraction of port Ids and operation of the pipeline as will be generally understood in the art.

Priority encoder 642 and comparater 646 are used to determine when the last port bit value in 641 is being output. As indicated, compare 646 determines when the values output by 642 and 644 are equal, which indicates that both the highest and lowest bit positions in 641 are the same, thus indicating that the last bit is being evaluated. As shown, when the values are equal, the equal signal enables 600a to move to a new set of port ids for comparison and to output a new Port Number Base 647. When not equal, searching is halted while the above describe processing takes place. When the values are equal, multiplexer 649 selects the newly output PPV rather than the reset bit logic for placement into the working PPR register 641.

When all portIDs have been evaluated, by 600a, MSN 628 is incremented and an evaluation of all ports is done again. Determination that all ports have been evaluated and therefor to increment the Master Sequence Number can be detected in a number of ways, such as by detecting when a Port Number Base 647 is at a maximum value.

4. Software Algorithm for Logarithmic Weights

FIG. 4 shows an example of how software may use logarithmic weights in a desired relationship in a particular embodiment between the weights and the port line speed. These values are examples only and will vary in different circuit implementations.

5. Alternative Illustrative Embodiment

Figure 5:
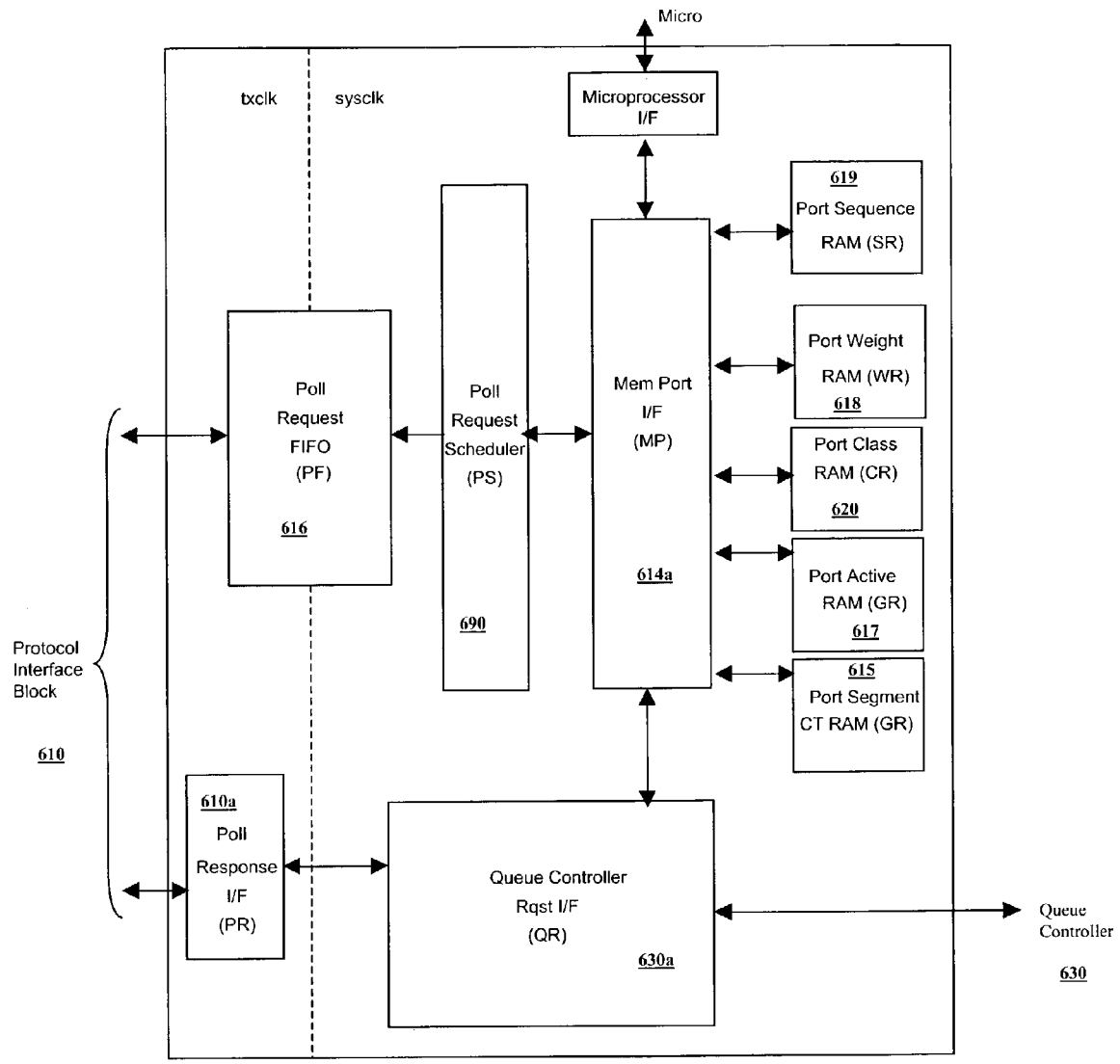
FIG. 5 illustrates an alternative functional block diagram for a scheduler as an example according to specific embodiments of the invention.

FIG. 5 illustrates an alternative functional block diagram for a scheduler as an example according to specific embodiments of the invention. Functional aspects of this embodiment are as described below. This figure shows an alternative configuration of a traffic manager LPS according to specific embodiments of the present invention and indicating differences from previous devices. Operation of these elements according to specific example embodiments of the invention is discussed below.

Queue Controller Including Optional Class Control

The Queue Controller 630 manages the queues for each of the ports. Associated with each port are of a number of classes. The classes allow the data for the port to be prioritized. Handling multiple classes (or priorities) of data for a port is discussed more fully in related patent applications 60/353,146 filed 31 Jan. 2002 and its subsequent utility application Ser. No. 10/356,369 filed 31 Jan. 2003. When Queue Controller receives data, it is enqueued on a particular class queue within a port. When Queue Controller is transmitting data, it is dequeued from the class queue within a port. The traffic manager (including a Poll Request Scheduler) is notified whenever initial data is enqueued or final data is dequeued from each of the class queues and maintains a per-port class status, e.g. in memory 620. Thus, the LPS activates or deactivates a class whenever it is informed of an enqueue or dequeue action, respectively. The LPS also maintains per-port sequence/weight values (e.g., in memories 619 and 618 respectively) used to determine how often a port should be evaluated for polling and a per-port segment count (e.g. in memory 615) to provide bandwidth fairness when packet data is involved.

Poll Request Scheduler (PS) and Poll Request FIFO (PF)

The Poll Request Scheduler (PS) module in the LPS is continuously looking for ports that need to be polled using a weighted interleaved round robin (WIRR) algorithm. It accomplishes this by monitoring each port's class not empty status. Factors used in evaluating whether a port is ready to be polled include: port's class status, port's sequence/weight value, and the port's segment count. If this evaluation is positive, then this port ID is stored in the Poll Request FIFO (PF) module contained in the LPS.

Protocol Interface Block

In specific embodiments, a device-level Protocol Interface block 610 retrieves the port numbers from the PF module and determines which ports are capable of accepting data. If a port can handle data, the Protocol Interface block sends notification to the Poll Response Interface (PR) 610a module. The PR module deals with clock boundary issues and passes notification to the Queue Controller Request (QR) module 630a contained in the LPS. The QR accepts the response after checking that the port satisfies certain criteria that ensure the poll response is valid. If the poll response for the port is invalid, the response is discarded and the QR waits to process the next response presented by the PR module (after retrieval from the Protocol Interface block).

Internal Shadow FIFO's

According to further embodiments of the present invention, Internal Shadow FIFO's can track the history of the transmissions requests issue by the QC because there is some filtering that has to be done with the positive poll responses coming back to the LPS. Generally, this takes into account what ports are already in progress and are being served. A further aspect is that there is a storage element where the data for the ports resides and it is generally limited in space. Therefore, the Internal Shadow FIFO's are used to attempt to keep track of occupancy level, or, in other words, to keep track of the quantity of items in the storage element(s).

In a specific example embodiment, QR 630a maintains internal shadow FIFO's that reflect the occupancy level of the device-level Transmit Data FIFO. PortID's are enqueued into shadow FIFO when the Queue Controller acknowledges an LPS transmit request without error. PortID's are dequeued from shadow FIFO when the device-level Protocol Interface block extracts data for transmission from the Transmit Data FIFO. When the shadow FIFO's indicate that there is room in the Transmit Data FIFO (e.g., 616) for another segment, QR issues a transmit request to the device-level Queue Controller block for this port. When Fragment (or packet) mode is enabled, upon receiving an acknowledge from the Queue Controller, the QR module will increment the port's segment count stored in RAM and begin the processing required for next transmission request. If Fragment (packet) mode is disabled, the QR module immediately begins the processing required for next transmission request upon receiving an acknowledge from the Queue Controller. When in Fragment Mode, the QR may camp on this PortID for a while (i.e. make several transmit requests for this port until receiving an End Of Fragment signal) or may capture another poll response (PortID) from the PR module.

Memory Port Interface Module (MP)

The Memory Port interface (MP) module 614a provides the arbitration to access the different types of internal context RAM. It arbitrates between a microprocessor interface module, the QR module, and the PS module. The MP ensures that accesses are permitted to complete uninterrupted and contains a mechanism to avoid address contention.

Context Data

Figure 6:
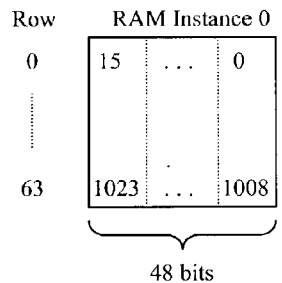
FIG. 6 illustrates configuration for control memory sections as an example according to specific embodiments of the invention.
Figure 6:
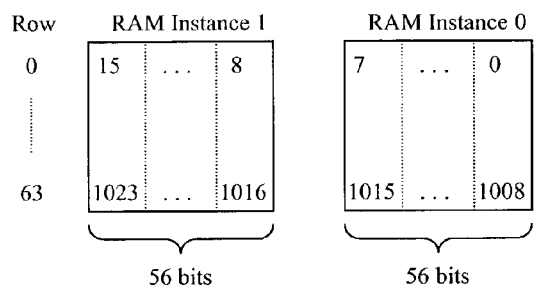
Figure 6:
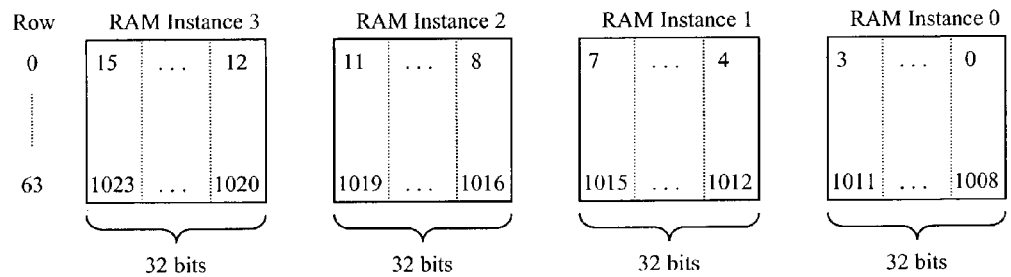
Figure 6:
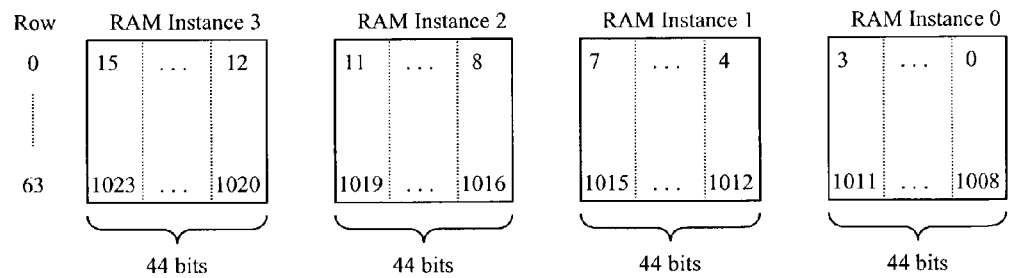

FIG. 6 illustrates configuration for control memory sections as an example according to specific embodiments of the invention. These figures depict an example arrangement of context data for each of 1K ports in an example embodiment.

Maximum Polling Rate

A maximum polling rate for a given port is generally determined by the number of active ports. If only one port is active amongst all ports (port's transmit data queue is not empty), the maximum polling rate according to specific embodiments of the present invention can be governed by the following formula:

$$\text{Max. polling rate} = f(\text{sysclk})/(N*2^{LW})$$

Where:
- N=2 if port limit is 32;
- N=16 if port limit is 256;
- N=32 if port limit is 512;
- N=64 if port limit is 1024; and
- LW=Logarithmic Weight of port Thus, according to specific embodiments of the present invention, a Loop Port Scheduler or similar device can deliver all segments from a given port contiguously while still maintaining fairness. This allows the blocks and/or transmitters upstream of the LPS to function without the need for Packet Reassembly. Furthermore, the Port segment Count ensures relative bandwidth allocation is independent of variable fragment (packet) size.

6. Embodiment in a Programmed Information Appliance

FIG. 7 is a block diagram showing a representative example logic device in which various aspects of the present invention may be embodied. As will be understood from the teachings provided herein, the invention can be implemented in hardware and/or software. In some embodiments, different aspects of the invention can be implemented in either client-side logic or server-side logic. Moreover, the invention or components thereof may be embodied in a fixed media program component containing logic instructions and/or data that when loaded into an appropriately configured computing device cause that device to perform according to the invention. A fixed media containing logic instructions may be delivered to a viewer on a fixed media for physically loading into a viewer's computer or a fixed media containing logic instructions may reside on a remote server that a viewer accesses through a communication medium in order to download a program component.

FIG. 7 shows an information appliance or digital device 700 that may be understood as a logical apparatus that can perform logical operations regarding image display and/or analysis as described herein. Such a device can be embodied as a general purpose computer system or workstation running logical instructions to perform according to specific embodiments of the present invention. Such a device can also be custom and/or specialized laboratory or scientific hardware that integrates logic processing into a machine for performing various sample handling operations. In general, the logic processing components of a device according to specific embodiments of the present invention is able to read instructions from media 717 and/or network port 719, which can optionally be connected to server 720 having fixed media 722. Apparatus 700 can thereafter use those instructions to direct actions or perform analysis as understood in the art and described herein. One type of logical apparatus that may embody the invention is a computer system as illustrated in 700, containing CPU 707, optional input devices 709 and 711, storage media (such as disk drives) 715 and optional monitor 705. Fixed media 717, or fixed media 722 over port 719, may be used to program such a system and may represent a disk-type optical or magnetic media, magnetic tape, solid state dynamic or static memory, etc. The invention may also be embodied in whole or in part as software recorded on this fixed media. Communication port 719 may also be used to initially receive instructions that are used to program such a system and may represent any type of communication connection.

The invention also may be embodied in whole or in part within the circuitry of an application specific integrated circuit (ASIC) or a programmable logic device (PLD). In such a case, the invention may be embodied in a computer understandable descriptor language, which may be used to create an ASIC, or PLD that operates as herein described.

7. Other Embodiments

The invention has now been described with reference to specific embodiments, including details of particular circuit implementations incorporating aspects of the invention. Other embodiments will be apparent to those of skill in the art. In particular, methods according to the invention can be used in a wide variety of communications applications different from those illustrated herein.

In particular, while the present invention has particular applications in scheduling DSLAM loop ports, the invention can also be used for scheduling low speed framers or PHY devices such as T1, E1, J1, J2, ATM25, E3, or DS3 devices.

Furthermore, the total number of ports supported can be varied based on the target application; the total number of weight values and sequence numbers used can be varied based on the target application's performance requirements; and when implementing LPS, the number of ports that are evaluated in parallel can be varied based on hardware limitations or capabilities and performance requirements.

Furthermore, the total number of weight values and sequence numbers used can be varied based on a target application's performance requirements.

It will be understood to those of skill in the art that the present invention is extensible to other physical data paths where a bus requires arbitration for variable rate ports. For instance, this allows the tiling-out of multiple port schedulers on a single bus, thus expanding the number of channels.

When implementing an LPS, the number of ports that are evaluated in parallel can be varied based on hardware limitations and/or performance requirements.

It is understood that the examples and embodiments described herein are for illustrative purposes and that various modifications or changes in light thereof will be suggested by the teachings herein to persons skilled in the art and are to be included within the spirit and purview of this application and scope of the claims. All publications, patents, and patent applications cited herein are hereby incorporated by reference in their entirety for all purposes.

What is claimed is:

1. A method of scheduling data transmission from a source to a plurality of destinations in an electronic logical system comprising:
   performing weighted scheduling of polling to destinations using a scheduler of said electronic logical system; and
   transmitting data units of different sizes to different destinations with successful polls using a shared transmit data buffer of said electronic logical apparatus;
   wherein said weighted scheduling accounts for data units of different sizes that are delivered to different destinations;
   wherein said weighted scheduling ensures overall fairness of data delivery to destinations and;
   assigning a destination a logarithmic weight value defining a relative rate at which the destination will be eligible to be polled and at which the destination will have its data volume count decremented.

2. The method according to claim 1 further comprising:
   using weighted interleaved round robin scheduling in conjunction with a weight spreader function to schedule polling.

3. The method according to claim 1 further wherein:
   said scheduling maintains fairness;
   said scheduling reduces head-of-line blocking;
   said scheduling reduces latency;
   said scheduling keeps track of a total volume of data delivered to a destination during a particular successful poll; and
   said scheduling suppresses subsequent polls to a particular destination based on previously delivered data volume to ensure fairness.

4. The method according to claim 1 further comprising:
   incrementing a count based on an amount of data delivered to a destination as a result of a poll;
   decrementing a count for a destination at a polling opportunity; and
   suppressing a poll to a destination based on a count value above a threshold.

5. The method according to claim 1 further comprising:
   assigning a weight value to help ensure that polled destinations have a high probability of being able to accept data.

6. The method according to claim 1 further comprising:
   only polling destinations for which data is pending for transmission; and
   decrementing a data volume count for destinations that are eligible for a poll regardless of whether data is pending for transmission.

7. The method according to claim 1 wherein a destination's relative weight is equal to two raised to the maximum logarithmic weight minus said assigned logarithmic weight.

8. The method according to claim 1 further comprising:
   assigning each destination a sequence value;
   assigning destinations with same weights to roughly evenly distributed sequence values;
   such that said sequence values evenly distribute polling of destinations of the same relative weight.

9. The method according to claim 1 further comprising:
   using a scheduler to cycle through a numerical sequence;
   wherein a destination is eligible for polling if the destination has data queued and if a number n of least significant bits (LSBs) of a destination sequence match n LSBs of a master sequence number, where n is a destination's logarithmic weight value or if said number n equals zero;
   wherein a destination is eligible for having its data volume count decremented if said number n match n LSBs of said master sequence number or if said number n equals zero.

10. The method according to claim 1 wherein:
    said scheduling does not require a particular assignment of destination identifications because relative weights are assigned independently of a destination identification; or
    said scheduling does not require a particular assignment of destination identifications because sequence numbers are assigned independently of a destination identification.

11. The method according to claim 1 wherein said scheduling does not require a particular assignment of destination identifications because said method can deliver variable data fragments while keeping track of data volume count to ensure fairness.

12. The method according to claim 1 further comprising:
    receiving data directed to a plurality of destinations;
    holding said data in queues; and
    for destinations with successful polls, transmitting data in variable length data fragments from said queues to a shared transmit data FIFO;
    signaling from said queue controller to a polling scheduler an identification for destinations with pending data.

13. A method of scheduling data transmission from a source to a plurality of destinations in an electronic logical system comprising:
    defining an internal count unit for data to be scheduled in said electronic logical system;
    assigning a transmission fragment size for one or more of said plurality of destinations, said transmission fragment size being a number of said internal count units;
    scheduling polling of said destinations using a scheduler of said electronic logical system;
    checking a count of internal count units previously transmitted to destinations scheduled to receive a poll and suppressing polling of destinations with counts above a threshold;
    issuing polls to destinations that are not suppressed;
    for a destination with a successful poll, transmitting a fragment for said destination;
    for a destination to which a fragment is transmitted, incrementing said count for said destination by a number of transmitted internal count units; and
    for a destination to which a poll is suppressed, decrementing said destination's count by a predetermined amount.

14. The method according to claim 13 further wherein:
    one or more destinations can be statically assigned different transmission fragment sizes.

15. The method according to claim 13 further wherein:
    one or more destinations can be dynamically assigned different transmission fragment sizes based on sizes of variable length incoming data.

16. The method according to claim 13 further wherein:
    said scheduling comprises:
    weighted scheduling that ensures overall fairness of data delivery to destinations while accounting for variable sized data fragments delivered to different destinations.

17. The method according to claim 13 further comprising: transmitting data to destinations with successful polls using a shared transmit data buffer.

18. The method according to claim 13 further comprising: pipelining outputs of said scheduling to allow a scheduler to continue scheduling while results of a previous scheduling are extracted.

19. The method according to claim 13 further comprising: using weighted interleaved round robin scheduling in conjunction with a weight spreader function to schedule polling.

* * * * *

UNITED STATES PATENT AND TRADEMARK OFFICE
CERTIFICATE OF CORRECTION

PATENT NO. : 7,639,693 B1  
APPLICATION NO. : 10/356707  
DATED : December 29, 2009  
INVENTOR(S) : Lewis et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1939 days.

Signed and Sealed this

Twenty-first Day of December, 2010

David J. Kappos  
*Director of the United States Patent and Trademark Office*